(12) United States Patent
Upton

(10) Patent No.: US 7,831,655 B2
(45) Date of Patent: *Nov. 9, 2010

(54) SYSTEM AND METHOD FOR IMPLEMENTING A SERVICE ADAPTER

(75) Inventor: Mitch Upton, Highlands Ranch, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 1758 days.

This patent is subject to a terminal disclaimer.

(21) Appl. No.: 10/271,410

(22) Filed: Oct. 15, 2002

(65) Prior Publication Data

US 2003/0093470 A1 May 15, 2003

Related U.S. Application Data

(60) Provisional application No. 60/347,919, filed on Oct. 18, 2001, provisional application No. 60/347,901, filed on Oct. 18, 2001.

(51) Int. Cl.
*G06F 15/16* (2006.01)
(52) U.S. Cl. .................................... 709/203
(58) Field of Classification Search .................. 709/203, 709/216–219, 223–224; 707/4; 715/740; 719/328, 329
See application file for complete search history.

(56) References Cited

U.S. PATENT DOCUMENTS

| 5,321,841 | A | 6/1994 | East et al. .................. 395/725 |
| 5,469,562 | A | 11/1995 | Saether |
| 5,604,860 | A | 2/1997 | McLaughlin et al. |
| 5,630,131 | A | 5/1997 | Palevich et al. |
| 5,748,975 | A | 5/1998 | Van De Vanter ............ 395/793 |
| 5,801,958 | A | 9/1998 | Dangelo et al. |
| 5,835,769 | A | 11/1998 | Jervis et al. ................. 395/701 |
| 5,836,014 | A | 11/1998 | Faiman, Jr. ................. 395/707 |
| 5,862,327 | A | 1/1999 | Kwang et al. |
| 5,867,822 | A | 2/1999 | Sankar |
| 5,933,838 | A | 8/1999 | Lomet ........................ 707/202 |
| 5,944,794 | A | 8/1999 | Okamoto et al. |
| 5,950,010 | A | 9/1999 | Hesse et al. |

(Continued)

FOREIGN PATENT DOCUMENTS

CA 2 248 634 3/2000

(Continued)

OTHER PUBLICATIONS

Sun Microsystems, "Java Message Service Version 1.0.2b", Aug. 27, 2001.*

(Continued)

*Primary Examiner*—J Bret Dennison
(74) *Attorney, Agent, or Firm*—Fliesler Meyer LLP

(57) ABSTRACT

A service adapter can be used to connect a client application to an enterprise system, or to connect application components, that otherwise might be unable to communicate with each other. A service adapter can invoke a service in the enterprise system, and can allow requests to be received to, and responses received from, the enterprise system. The service adapter can pass these requests and responses in a format such as XML, and can transform data passing between the enterprise system and an application or application component. An application view component can be used to provide an interface to an enterprise system for an application.

41 Claims, 6 Drawing Sheets

U.S. PATENT DOCUMENTS

| | | | |
|---|---|---|---|
| 5,961,593 A | 10/1999 | Gabber et al. | 709/219 |
| 5,966,535 A | 10/1999 | Benedikt et al. | |
| 5,986,657 A | 11/1999 | Berteig et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | 701/201 |
| 6,028,997 A | 2/2000 | Leymann et al. | |
| 6,029,000 A | 2/2000 | Woolsey et al. | |
| 6,044,217 A | 3/2000 | Brealey et al. | 395/701 |
| 6,061,695 A | 5/2000 | Slivka et al. | |
| 6,067,623 A | 5/2000 | Blakeley, III et al. | 713/204 |
| 6,070,184 A | 5/2000 | Blount et al. | |
| 6,085,030 A | 7/2000 | Whitehead et al. | |
| 6,092,102 A | 7/2000 | Wagner | |
| 6,119,149 A | 9/2000 | Notani | 709/205 |
| 6,125,363 A * | 9/2000 | Buzzeo et al. | 707/100 |
| 6,141,686 A | 10/2000 | Jackowski et al. | |
| 6,141,701 A | 10/2000 | Whitney | |
| 6,148,336 A | 11/2000 | Thomas et al. | |
| 6,154,738 A | 11/2000 | Call | |
| 6,185,734 B1 | 2/2001 | Saboff et al. | |
| 6,189,044 B1 | 2/2001 | Thomson et al. | |
| 6,212,546 B1 | 4/2001 | Starkovich et al. | |
| 6,222,533 B1 | 4/2001 | Notani et al. | 345/329 |
| 6,226,675 B1 | 5/2001 | Meltzer et al. | |
| 6,226,788 B1 | 5/2001 | Schoening et al. | |
| 6,230,287 B1 | 5/2001 | Pinard et al. | 714/31 |
| 6,230,309 B1 * | 5/2001 | Turner et al. | 717/107 |
| 6,237,135 B1 | 5/2001 | Timbol | |
| 6,243,737 B1 | 6/2001 | Flanagan et al. | |
| 6,256,676 B1 * | 7/2001 | Taylor et al. | 709/246 |
| 6,269,373 B1 | 7/2001 | Apte et al. | |
| 6,282,711 B1 | 8/2001 | Halpern et al. | |
| 6,292,932 B1 | 9/2001 | Baisley et al. | |
| 6,311,327 B1 | 10/2001 | O'Brien et al. | |
| 6,324,681 B1 | 11/2001 | Sebesta et al. | 717/1 |
| 6,330,569 B1 | 12/2001 | Baisley et al. | |
| 6,334,114 B1 | 12/2001 | Jacobs et al. | |
| 6,336,122 B1 | 1/2002 | Lee et al. | |
| 6,338,064 B1 | 1/2002 | Ault et al. | 707/9 |
| 6,343,265 B1 | 1/2002 | Glebov et al. | |
| 6,345,283 B1 | 2/2002 | Anderson | |
| 6,348,970 B1 | 2/2002 | Marx | |
| 6,349,408 B1 | 2/2002 | Smith | |
| 6,353,923 B1 | 3/2002 | Bogel et al. | 717/4 |
| 6,356,906 B1 | 3/2002 | Lippert et al. | |
| 6,360,221 B1 | 3/2002 | Gough et al. | |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | |
| 6,408,311 B1 | 6/2002 | Baisley et al. | |
| 6,411,698 B1 | 6/2002 | Bauer et al. | |
| 6,438,594 B1 | 8/2002 | Bowman-Amuah | |
| 6,445,711 B1 | 9/2002 | Scheel et al. | |
| 6,463,503 B1 | 10/2002 | Jones et al. | 711/114 |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,769 B1 | 5/2003 | Moore et al. | |
| 6,564,693 B2 | 5/2003 | Daniel | 709/219 |
| 6,567,738 B2 | 5/2003 | Gopp et al. | |
| 6,584,454 B1 | 6/2003 | Hummel et al. | |
| 6,594,700 B1 | 7/2003 | Graham et al. | |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 * | 2/2004 | Najmi | 714/4 |
| 6,721,740 B1 | 4/2004 | Skinner et al. | |
| 6,721,747 B2 | 4/2004 | Lipkin | |
| 6,721,779 B1 | 4/2004 | Maffeis | |
| 6,732,237 B1 | 5/2004 | Jacobs et al. | 711/119 |
| 6,738,975 B1 * | 5/2004 | Yee et al. | 719/310 |
| 6,748,420 B1 | 6/2004 | Quatrano et al. | |
| 6,754,884 B1 | 6/2004 | Lucas et al. | |
| 6,757,689 B2 * | 6/2004 | Battas et al. | 707/101 |
| 6,767,520 B2 | 7/2004 | Pikus | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | 707/104.1 |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 | 3/2005 | Murray et al. | |
| 6,877,023 B1 * | 4/2005 | Maffeis et al. | 709/202 |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,920,461 B2 | 7/2005 | Hejlsberg et al. | |
| 6,922,827 B2 | 7/2005 | Vasilik et al. | |
| 6,950,872 B2 | 9/2005 | Todd, II | |
| 6,959,307 B2 | 10/2005 | Apte | |
| 6,959,340 B1 * | 10/2005 | Najmi | 709/246 |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,089,584 B1 | 8/2006 | Sharma | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,134,072 B1 | 11/2006 | Lovett et al. | |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,231,421 B2 * | 6/2007 | Kawakura et al. | 709/203 |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 7,269,625 B1 * | 9/2007 | Willhide et al. | 709/206 |
| 7,275,220 B2 | 9/2007 | Brummel et al. | |
| 7,406,664 B1 | 7/2008 | Morton et al. | |
| 7,543,024 B2 | 6/2009 | Holstege | |

| | | |
|---|---|---|
| 2001/0032263 A1 | 10/2001 | Gopal et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Macready et al. |
| 2002/0035604 A1 | 3/2002 | Cohen et al. |
| 2002/0038336 A1* | 3/2002 | Abileah et al. ............... 709/203 |
| 2002/0049788 A1 | 4/2002 | Lipkin et al. |
| 2002/0073080 A1 | 6/2002 | Lipkin |
| 2002/0073236 A1 | 6/2002 | Helgeson et al. |
| 2002/0073396 A1 | 6/2002 | Crupi et al. |
| 2002/0078365 A1 | 6/2002 | Burnette et al. |
| 2002/0083075 A1 | 6/2002 | Brummel et al. |
| 2002/0091944 A1* | 7/2002 | Anderson et al. ........... 713/201 |
| 2002/0111922 A1 | 8/2002 | Young et al. |
| 2002/0116454 A1* | 8/2002 | Dyla et al. .................. 709/203 |
| 2002/0120685 A1 | 8/2002 | Srivastava et al. |
| 2002/0138582 A1 | 9/2002 | Chandra et al. |
| 2002/0143960 A1 | 10/2002 | Goren et al. |
| 2002/0152106 A1 | 10/2002 | Stoxen et al. |
| 2002/0152244 A1* | 10/2002 | Dean et al. .................. 707/530 |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184145 A1 | 12/2002 | Sijacic et al. |
| 2002/0184610 A1 | 12/2002 | Chong et al. |
| 2002/0188486 A1 | 12/2002 | Gil et al. |
| 2002/0188513 A1 | 12/2002 | Gil et al. |
| 2002/0194221 A1 | 12/2002 | Strong et al. |
| 2002/0194244 A1 | 12/2002 | Raventos |
| 2002/0194267 A1 | 12/2002 | Flesner et al. |
| 2002/0194495 A1* | 12/2002 | Gladstone et al. ........... 713/200 |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1* | 1/2003 | Amirisetty et al. .......... 709/328 |
| 2003/0018963 A1 | 1/2003 | Ashworth et al. |
| 2003/0023957 A1 | 1/2003 | Bau et al. |
| 2003/0028579 A1 | 2/2003 | Kulkarni et al. |
| 2003/0041050 A1 | 2/2003 | Smith et al. |
| 2003/0041198 A1 | 2/2003 | Exton et al. |
| 2003/0043191 A1 | 3/2003 | Tinsley et al. |
| 2003/0046266 A1 | 3/2003 | Mullins et al. |
| 2003/0046591 A1 | 3/2003 | Asghari-Kamrani et al. |
| 2003/0051063 A1* | 3/2003 | Skufca et al. ............... 709/310 |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0065827 A1* | 4/2003 | Skufca et al. ............... 709/315 |
| 2003/0069975 A1* | 4/2003 | Abjanic et al. .............. 709/227 |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0084203 A1 | 5/2003 | Yoshida et al. |
| 2003/0093470 A1* | 5/2003 | Upton ........................ 709/203 |
| 2003/0110117 A1 | 6/2003 | Saidenbereg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2003/0233631 A1 | 12/2003 | Curry |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1 | 4/2004 | Ghoneimy et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vaschillo et al. |
| 2005/0223392 A1* | 10/2005 | Cox et al. .................... 719/328 |
| 2005/0256935 A1* | 11/2005 | Overstreet et al. .......... 709/208 |
| 2005/0278585 A1 | 12/2005 | Spencer |
| 2006/0085797 A1* | 4/2006 | Connelly .................... 719/314 |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| EP | 1 006 443 A2 | 6/2000 |
| EP | 1 061 445 A2 | 12/2000 |
| WO | WO9923558 | 5/1999 |
| WO | WO 00/29924 | 5/2000 |
| WO | 01/90884 A2 | 11/2001 |

OTHER PUBLICATIONS

XAResource (Java 2 Platform EE v1.4), "Interface XAResource", Dec 12, 2002.*

FOLDOC, "Definition of JMS", "http://foldoc.org/?JMS" Jun. 22, 2001.*

U.S. Appl. No. 10/271,047, filed Oct. 15, 2002, Mitch Upton.
U.S. Appl. No. 10/271,156, filed Oct. 15, 2002, Mitch Upton.
U.S. Appl. No. 10/271,157, filed Oct. 15, 2002, Mitch Upton.
U.S. Appl. No. 10/271,162, filed Oct. 15, 2002, Mitch Upton.
U.S. Appl. No. 10/271,194, filed Oct. 15, 2002, Mitch Upton.
U.S. Appl. No. 10/271,215, filed Oct. 15, 2002, Mitch Upton.
U.S. Appl. No. 10/271,244, filed Oct. 15, 2002, Mitch Upton.
U.S. Appl. No. 10/271,402, filed Oct. 15, 2007, Mitch Upton.
U.S. Appl. No. 10/271,414, filed Oct. 15, 2002, Mitch Upton.
U.S. Appl. No. 10/271,423, filed Oct. 15, 2002, Mitch Upton.

Hewlett-Packard, *HP Application Server*, Technical Guide Version 8.0, HP, Nov. 15, 2001, pp. 1-234.

Sun Microsystems, *IPlanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services*, Department of Computer Science Boston University, Dec. 2000, pp. 1-22.

Marcello Mariucci, *Enterprise Application Server Development Environments*, University of Stuttgart, Oct. 10, 2000, pp. 1-30.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

C. Moran et al. "*ARIES: A Transaction Recovery Method Supporting Fine-Granularity Locking and Partial Rollbacks Using Write-Ahead Logging*", ACM Transaction on Database Systems, vol. 17, No. 1, Mar. 1992, pp. 94-162.

"Introducing Microsoft DotNet"; byChristopheLauer, Jul. 2, 2002; http://web.archive.org/web/20020702162429/http://www.freevbcode.com/ShowCode.asp?ID=2171; pp. 1-10.

Paul, Laura Gibbone, "RosettaNet: Teaching business to work together", Oct. 1, 1999. http://www.developer.com/xml/article.php/616641.

Blake, Ruled-Driven Coordination Agent: "A Self-Configureable Agent Architecture for Distributed Control"; IEEE Mar. 2001, pp. 271-277.

Dahalin et al., Workflow Interoperability Using Extensible Markup Language (XML), IEEE, Jul. 2002, pp. 513-516.

Kunisetty "Workflow Modeling and simulation Using an Extensible Object-Oriented Knowledge Base Management System" Citeseer, 1996, pp. 1-60.

Van Der Aalst et al., Verification of XRL: An XML-Based Workflow Language, IEEE, Jul. 2001, pp. 427-432.

HP, "hp application server" developer's guide, version 8.0, 1999-2001, pp. 27-81, 127, 160, 195-271.

Java$_{TM}$Debug Interface, definitions, retrieved from <URL http://java.sun.com/j2se/1.4.2/docs/guide/jpda/jdi/overview-summary.html, Feb. 21, 2007.

Kilgore, "Multi-Language, Open-Source Modeling Using the Microsoft Architecture", Simulation Conference, 2002, Proceedings of the Winter, Dec. 8-11, 2002, vol. 1, pp. 629-633.

Embury et al., "Assisting the Comprehension of Legacy Transaction", Reverse Engineering, 2001, Proceedings, Eighth Working Conference on Oct. 2-5, 2001, pp. 345-354.

May et al., "A Persistent store for Large Shared Knowledge Bases", Knowledge and Data Engineering, IEEE Transactions on vol. 3, Issue 1, Mar. 1991, pp. 33-41.

Tang et al., "Integrating Remote Invocation and Distributed Shared State", Parallel and Distributed Processing Symposium, 2004, Proceedings, 18th International, Apr. 26-30, 2004, (10 pages).

Bugunovi, "A programming Model for Composing Data Flow Collaborative Applications", 1999 IEEE, retrieved Apr. 10, 2007.

Sung, et al. "A Multimedia Authorizing Tool for the Internet", 1997 IEEE, pp. 304-308, retrieved Apr. 10, 2007.

Smith, et al. "Marching Towards a Software Reuse Future", ACM, Nov./Dec. 1994, pp.62-72, retrieved Apr. 10, 2007.

Sosnoski, "XML and Java Technologies: Data Binding, Part 1: Code Generation Approaches—JAXB and more", IBM, pp. 1-11, 2003.

Erich Liebmann et al., "Adaptive Data Dissemination and Caching for Edge Service Architectures Built with the J2EE", Mar. 2004, ACM Press, 2004 ACM Symposium on Applied Computing, pp. 1717-1724.

Chen et al., "eCo Architecture for Electronic Commerce Interoperability", Jun. 29, 1999, CommerceNet, pp. 1-107.

Bea Systems, Inc., "Transforming Data Using Xquery Mapper", BEA AquaLogic Service Bus 2.0 Documentation, 2006, 19 pages.

Stylus Studio, "Xquery Mapper", 2007, Stylus Studios, 6 pages.

Altova, "XML-toXML Mapping", 2007, 3 pages, Altova Map Force.

Jamper, "Jamper-Java XML Mapper", 2007, 4 pages, Sourceforge.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Van Der Aalst et al., "XML Based Schema Definition for Support of Inter-Organizational Workflow", University of Colorado and University of Eindhoven report, 2000, retrieved from http://citeseer.ist.psu.edu/vanderaalst00mxl.html, 39 pages.

Plaindoux, "XML Transducers in Java", May 2002, The Eleventh International World Wide Conference, retrieved from: http://www2002.org/CDROM/poster/132/index.html., 6 pages.

Microsoft, "Microsoft.net Framework", Microsoft Corporation, 2001, 54 pages.

Willink, "Meta-Compilation for C ++", University of Surrey, Jan. 4, 2000, 379 pages.

Supplementary European Search Report for EP 02784131.1-1243 PCT/US0233098 dated Aug. 8, 2007, 4 pages.

Allamaraju, et al., "Professional Java Server Programming J2EE 1.3 Edition", Sep. 2001, pp. 1009-1057, WROX.

Sharma, "J2EE Connector Architecture Specification, Version 1.0 Final Release", Java$^{TM}$ 2 Enterprise Edition, Aug. 2001, 90 pages, Sun Microsystems.

Muller, "Event-Oriented Dynamic Adaptation of Workflows: Model, Architecture and Implementation", 2002, 351 pages, University of Leipzig, Germany.

Peltz, "Web Services Orchestration" Hewlett-Packard, Jan. 2003, 20 pages.

Wikipedia, "Java Architecture for XML Binding (JAXB)", 3 pages Retrieved from <http://en.wikipedia.org/wiki/JAXB> on Nov. 21, 2007.

Ort, "Java Architecture for XML Binding (JAXB)", 14 pages. Retrieved from <http://java.sun.com/developer/technical/Articles/WebServies/jaxb> on Nov. 21, 2007.

Newcomer, "Understanding Web Services: XML, WSDL, SOAP, and UDDI", May 2002, 359 pgs.

Shannon, "Java 2 Platform Enterprise Edition Specification", Oct. 20, 2000, 170 pages, V1.3.

Sun Microsystems, "J2EE Connector Architecture 1.0," Aug. 2001, XP00244954, retrieved form the Internet: URL: hltp://java.sun.com/j2ee/connector/download.html, pp. 1-179.

Bea, "Transforming Data Using Xquery Mapper," 2006, BEA AquaLogic Service Bus 2.0 Documentation, pp. 1-19.

Sall, XML Syntax and Parsing Concepts, Informit.com, May 31, 2002, pp. 1-25.

* cited by examiner

SYSTEM AND METHOD FOR IMPLEMENTING A SERVICE ADAPTER

CLAIM OF PRIORITY

This application claims priority to U.S. Provisional Patent Application No. 60/347,919, filed Oct. 18, 2001, entitled "APPLICATION VIEW," as well as Application No. 60/347,901, filed Oct. 18, 2001, entitled "EVENT ADAPTER," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "APPLICATION VIEW COMPONENT FOR SYSTEM INTEGRATION," by Mitch Upton, filed Oct. 15, 2002.

U.S. patent application Ser. No. 10/271,162 entitled "SYSTEM AND METHOD FOR PROVIDING A JAVA INTERFACE TO AN APPLICATION VIEW COMPONENT," by Mitch Upton, filed Oct. 15, 2002.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002.

U.S. patent application Ser. No. 10/271,157 entitled "SYSTEM AND METHOD FOR IMPLEMENTING AN EVENT ADAPTER," by Mitch Upton. filed Oct. 15, 2002.

U.S. patent application Ser. No. 10/271,156 entitled "SYSTEM AND METHOD USING A CONNECTOR ARCHITECTURE FOR APPLICATION INTEGRATION," by Mitch Upton, filed Oct. 15, 2002.

U.S. patent application Ser. No. 10/271,047 entitled "SYSTEM AND METHOD FOR IMPLEMENTING A SCHEMA OBJECT MODEL IN APPLICATION INTEGRATION," by Mitch Upton, filed Oct. 15, 2002.

U.S. patent application Ser. No. 10/271,402 entitled "SYSTEM AND METHOD UTILIZING AN INTERFACE COMPONENT TO QUERY A DOCUMENT," by Mitch Upton, filed Oct. 15, 2002.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,215 entitled "SYSTEMS AND METHODS FOR INTEGRATION ADAPTER SECURITY," by Mitch Upton, filed Oct. 15, 2002.

FIELD OF THE INVENTION

The invention relates generally to adapters useful for invoking services against a resource such as an enterprise system.

BACKGROUND

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their. Further, each of these integration systems or servers has its own proprietary API, such that packaged application vendors cannot leverage development beyond a single integration server. This fragmentation of the integration market has provided little financial incentive for third parties.

BRIEF SUMMARY

Systems and methods for connecting a client application to a resource such as an enterprise system can utilize a service adapter, in accordance with embodiments of the present invention. An application view component can be used to provide an interface to an enterprise system for an application. A service adapter can invoke a service in the enterprise system, and can allow requests to be received to, and responses received from, the enterprise system. The service adapter can pass these requests and responses in a format such as XML, and can transform data passing between the enterprise system and an application or application component.

Other features, aspects, and objects of the invention can be obtained from a review of the specification, the figures, and the claims.

DETAILED DESCRIPTION OF THE INVENTION

Figure 1:
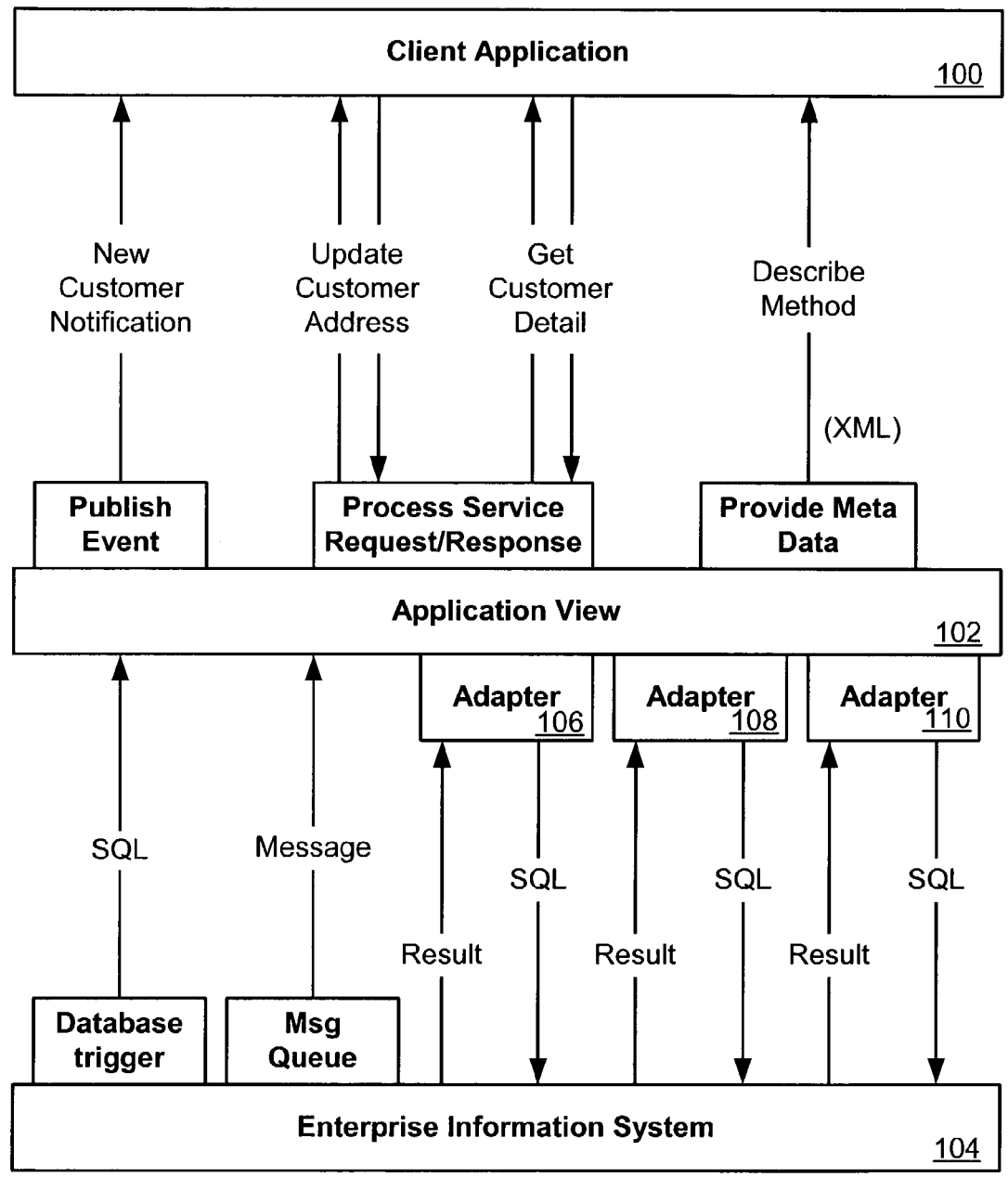
FIG. 1 is a diagram of a system that can be used in accordance with one embodiment of the present invention.

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

The development and widespread acceptance of standards such as the Java 2 Platform, Enterprise Edition (J2EE) from Sun Microsystems, Inc. of Santa Clara, Calif., as well as the eXtensible Markup Language (XML), has laid the groundwork for a standardized approach to the development of these adapters. Perhaps the most significant of these standards for application integration is the J2EE Connector architecture. The J2EE Connector architecture provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services. Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply: edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bidirectional communication can also be supported in adapters.

An application view can be an integral part of an integration framework. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

In one example, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

An application view can support events and services for an application through an underlying adapter. These events and services can be established for a particular use, such as for a particular business process. In one example, an "event" enables messages generated by an application to be managed following a publish/subscribe model. In this model, users can "subscribe" to receive messages that are "published" by an application. Each message can be referred to as a publication event. Such a model can be implemented through multicasting, for example.

Services

A "service" can act as a business function that can be invoked by a user. Service invocations can cause messages to be sent to an application following a request/response model. This model can differ from a publish/subscribe model, in that messages are only sent when requested by a user. This can be implemented, for example, using a point-to-point messaging system. Both events and services can be passed through the system as XML documents.

A service can constitute business logic within an application that an application view exposes for reuse. When an application view receives an XML document containing a request to invoke a business service, the application view can invoke that functionality within its target application and return an XML document that describes the result. Each service on an application view can represent a single function, such as a single, logical business function, within a target application. A service can take request data, such as in the form of an XML document, and return response data, which can also take the form of an XML document. Services can represent bi-directional communication between an application view client and a target application. Services can allow for synchronous or asynchronous communication between applications.

Figure 2:
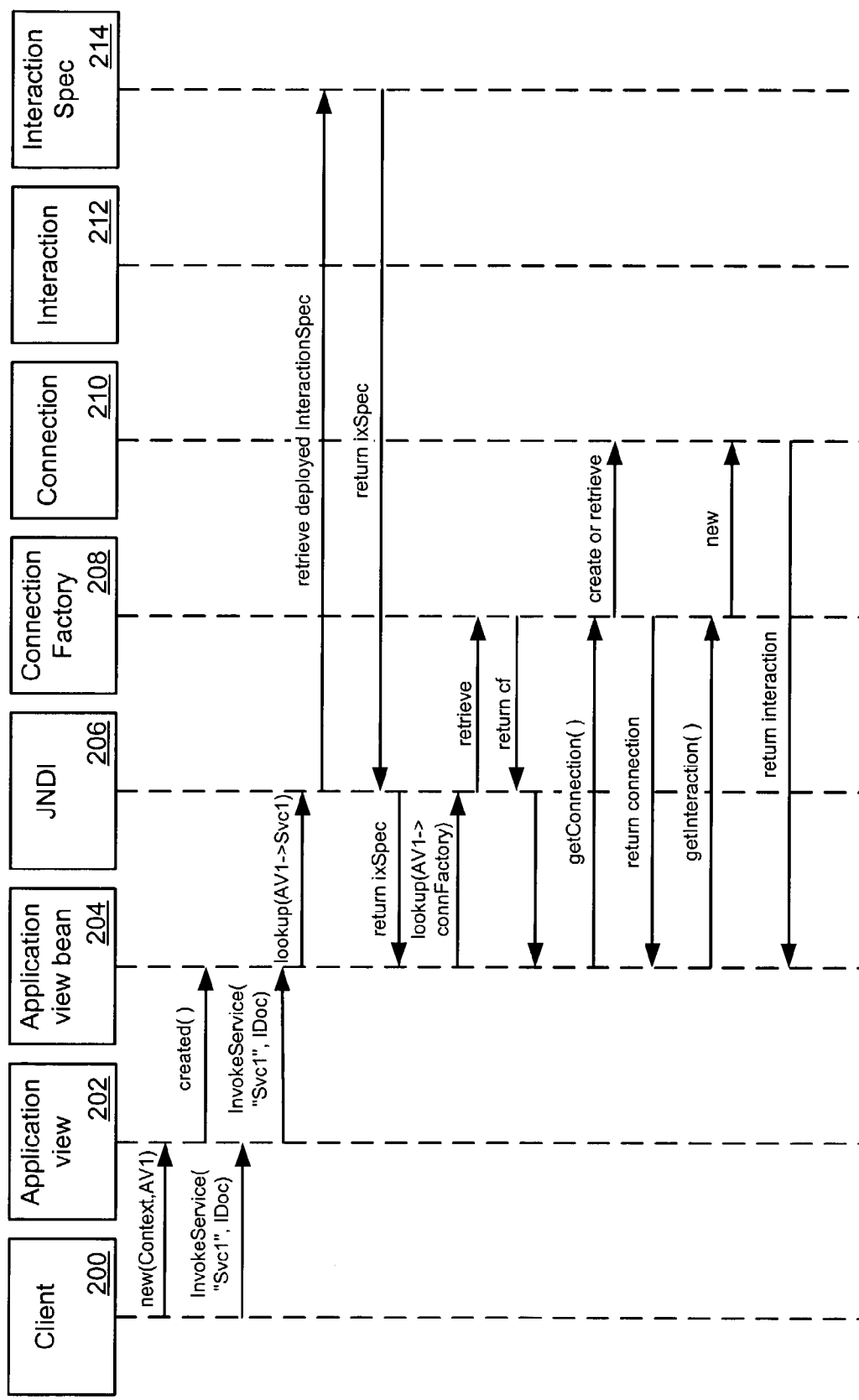
FIGS. 2 and 3 are portions of a synchronous invoke method that can be used with the system of FIG. 1.
Figure 3:
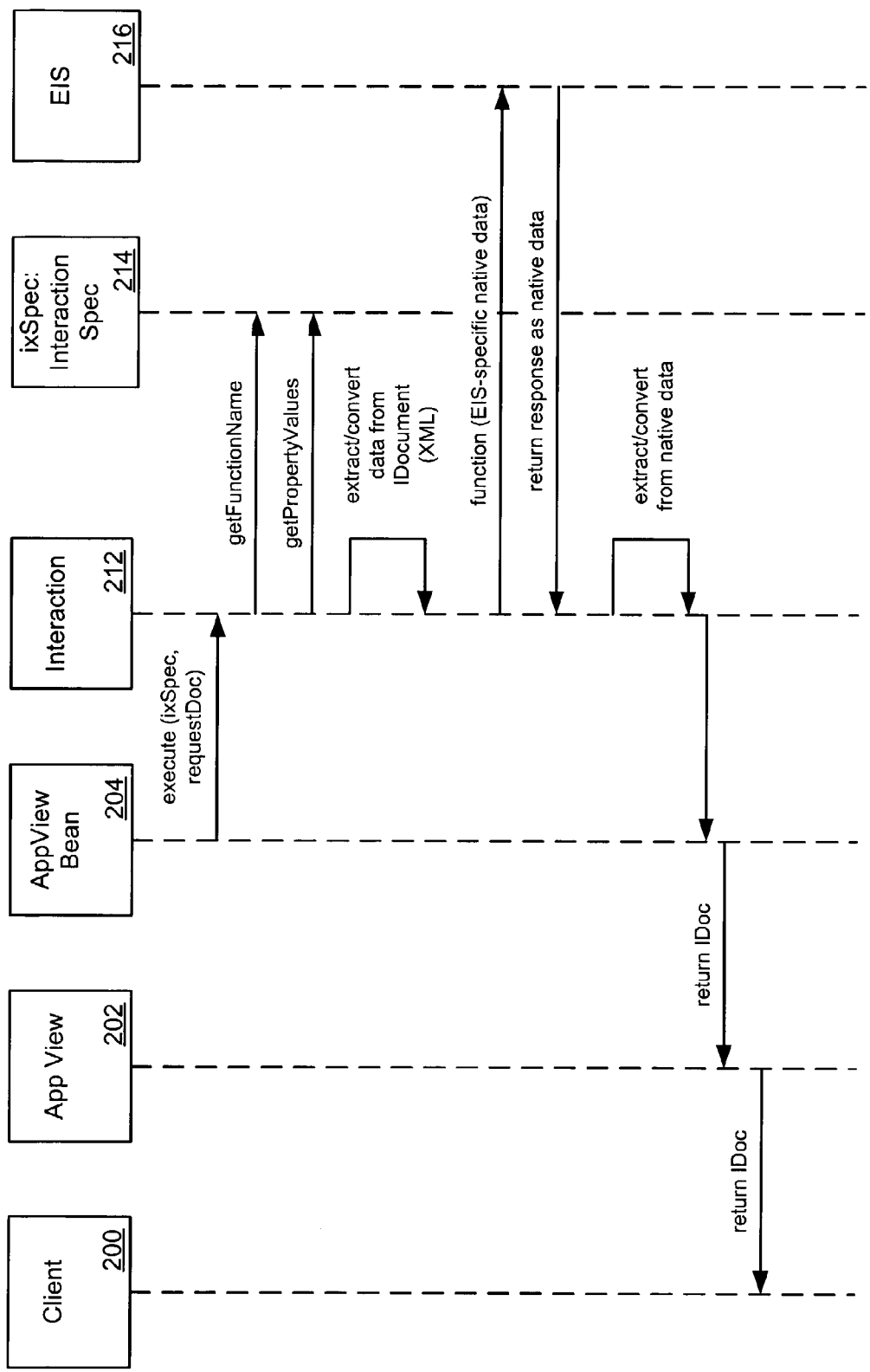

FIGS. 2 and 3 refer to one method for the synchronous invoking of services that can be used, for example, with a system as shown in FIG. 1. Across the top of the figures are various objects that can be used in an interaction, including a client 200, an application view 202, an application view bean 204, a JNDI service 206, a connection factory 208, a connection 210, an interaction 212, an interaction specification 214, and an enterprise information system 214. In invoking a service, a user or client 200 might, for example, call functionality to get details relating to a customer from an EIS system 216. FIG. 2 shows the first part, and FIG. 3 the second part, of one sequence of steps that can occur in an application view engine to enable a client to invoke a service in an EIS.

In the first step, a Java object or application view 202 is issued from the client 200 for a web service. Three basic clients in this example can include workflow, BPM, and custom-coded Java applications. A new instance will be created on the server by creating an enterprise java bean, triggered by calling an ejbCreate( ) or create( ) routine.

The client 200 requests and receives the Request Document or IDoc definition for a service, such as GetCustomerDetail, in the example referred to as Service 1, or "Svc1." This definition can be used to create a default document. Creating a default document does a lot of the work otherwise required of a user by filling in a skeleton XML document to be sent to the backend EIS. It also saves the client a lot of work in creating a document, as the definition knows exactly how the document should look.

Once the skeleton document is created, the client can call a routine to set various parameters on the request into the XML document, such as setting a customer number, name, or address. After the client has set all the necessary parameters on a document, or IDoc, the client 200 can use the application view 202 to invoke the service, such as by calling "InvokeService." The user can pass the request document with the invoke.

The invoke request can trigger an application view bean 204 to begin interacting with a J2EE connector, or Connection Factory 208, such as by calling "GetInteraction." Such a routine can get a connection, such as to SAP. The connector architecture can provide for connection pulling, transaction management, and security services for adapters. The connector architecture can get the interaction on the connection, then execute the interaction and pass the request document. The interaction object can be provided by a resource adapter. SAP, for example, builds a particular interaction into an adapter.

The interaction can figure out what specific EIS functionality is being invoked, and can invoke that functionality on the EIS ("function") object 216. This approach is very adapter-specific. Some of the value added to the J2EE Connector architecture is that this functionality is hidden behind standard APIs. Finally, the interaction object 212 can create a response XML document that is passed back to the client 200.

Figure 4:
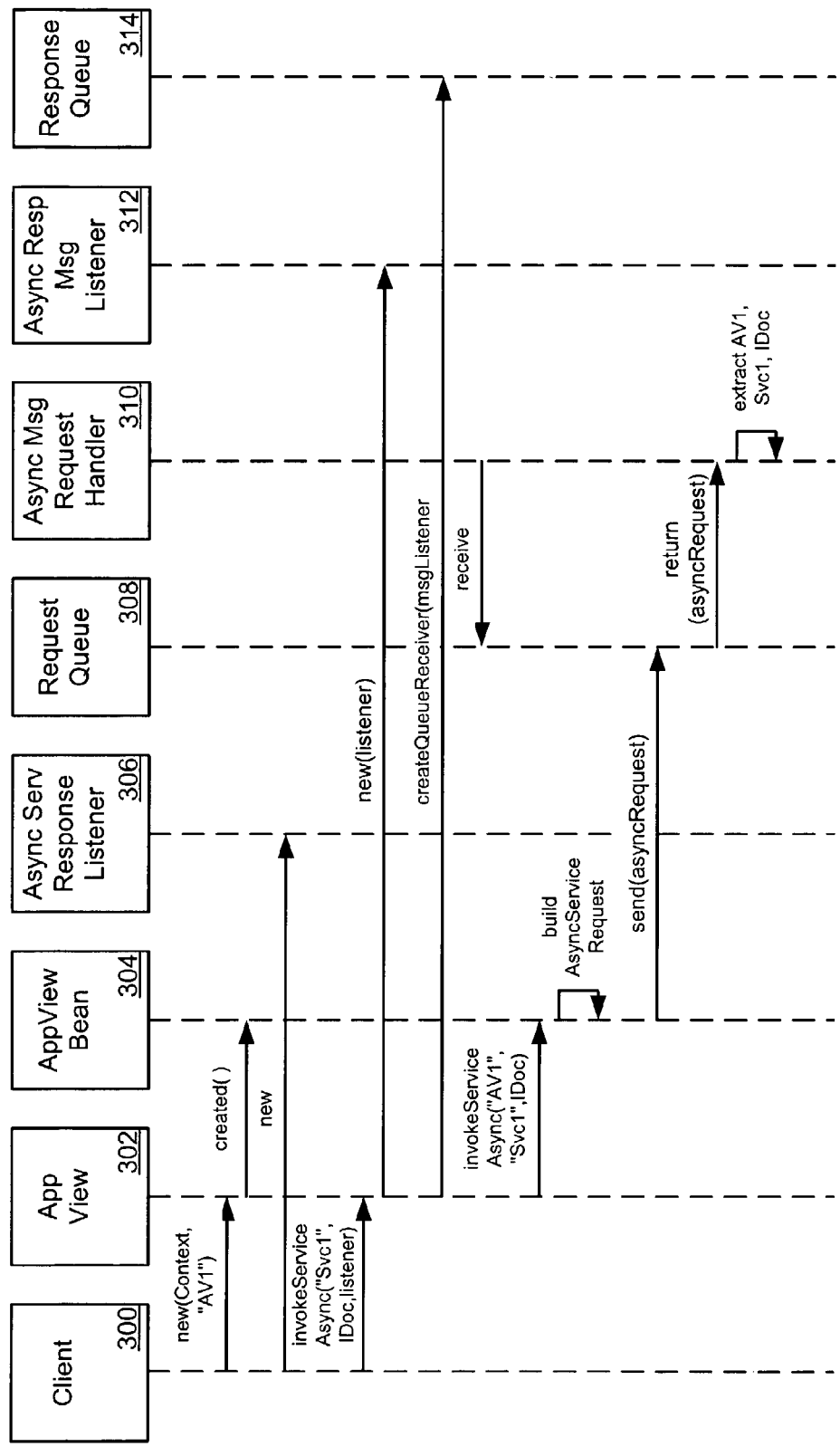
FIGS. 4 and 5 are portions of an asynchronous invoke method that can be used with the system of FIG. 1.
Figure 5:
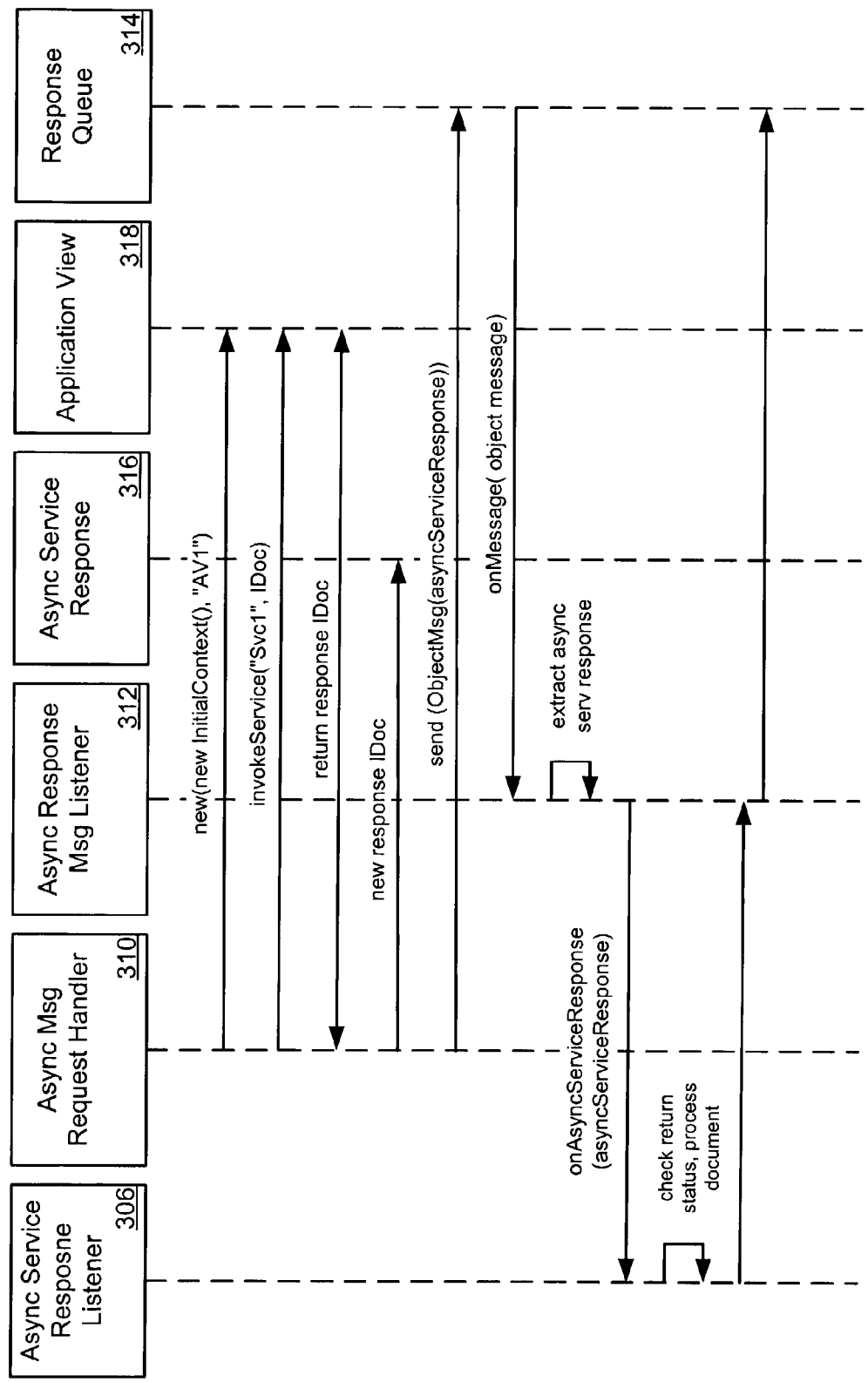

In such a synchronous invoke, a client 200 makes a request and waits until a response is received before the client proceeds with processing. Asynchronous invokes can also be supported. One synchronous approach is shown in FIGS. 4 and 5. Across the top of the figures are various objects that can be used in an interaction, including a client 300, an application view 302, an application view bean 304, an asynchronous service response listener 306, a request queue 308, an asynchronous message request handler 310, an asynchronous response message listener 312, a response queue 314, an asynchronous service response 316, and an application view 318. In asynchronous mode, a client 300 can make a request for which the client does not need a response right away, but is able to come back later to get the response. This approach can be more complicated than a synchronous approach, as it is necessary to use an underlying queuing mechanism to track requests to, and responses from, an EIS.

Once a client sets up an application view, that application view can have a unique identifier. The unique identifier can be used for filtering back on the server. A user can create a document and invoke a service, such as by calling "invokeServiceAsync". A call-back listener can be passed, which handles the response when it comes back from the server. The application view can post the request onto a JMS queue using a call such as "post (AsyncRequest) via JMSQueueSender."

A return response document, or IDoc, can be put into a message queue, such as a JMS queue, by calling a method such as "onMessage(asyncRespMessage)," which can be a virtual call. When the user invoked the service, a call-back listener was registered. Once a message arrives on a JMS queue, the call-back listener can look at the response and determine the appropriate listener to notify that the response has returned. A request such as "OnAsyncServiceResponse" can be serviced on the callback listener. The client can then have a response document in its callback listener, and can do with the document whatever is necessary.

Service Adapters

As discussed above, adapters can be developed as service or event adapters. A service adapter can invoke a specific function in the resource or enterprise system to which it is connected. An event adapter can propagate information from the enterprise system to the integration environment. For each application view, businesses can add any number of services and events to an application view definition to support specific types of transactions between an application server and the target enterprise system. Because an adapter can use XML to translate an application's data format, business analysts do not need to understand the format. If a business analyst wants to use an adapter, it is only necessary for the analyst to know how to define and use application views. Best of all, because all adapters can use a similar Web-based interface for defining application views, it can be easy to learn to use current and future adapters. XML can make application integration smooth both for developers and business analysts.

The J2EE specification does not currently provide guidelines for an EIS to initiate communication with the application server or client. Application integration can provide this capability through the user of event adapters. Another important feature of an application view is the ability to support bi-directional communication. The J2EE specification does not currently provide guidelines for an EIS to initiate communication with the application server or client. This capability also can be provided by an event adapter. When added to an application view, each event responds to a particular enterprise application state. When a particular event is triggered, an application view can extract data about the event from the enterprise system and propagate the data in an XML document to the integration environment.

Similarly, when added to an application view, each service can represent a particular function in an enterprise system. When an application view receives an XML document that maps to a particular server, it can invoke the corresponding function in the enterprise system using the service adapter. The enterprise system can in some embodiments send a response to the service.

Service adapters in accordance with one embodiment of the present invention can receive an XML request document from a client and invoke a specific function in the underlying enterprise information system (EIS). Service adapters are consumers of messages and can in some instances provide a response. There are two primary ways to invoke a service, using either an asynchronous approach or a synchronous approach. With an asynchronous service adapter, a client application issues a service request and proceeds with its processing. The client application does not wait for the response. With a synchronous service adapter, a client waits for a response before proceeding with its processing. Application integration can support both of these service adapter invocations, relieving a user from having to provide this functionality.

Figure 6:
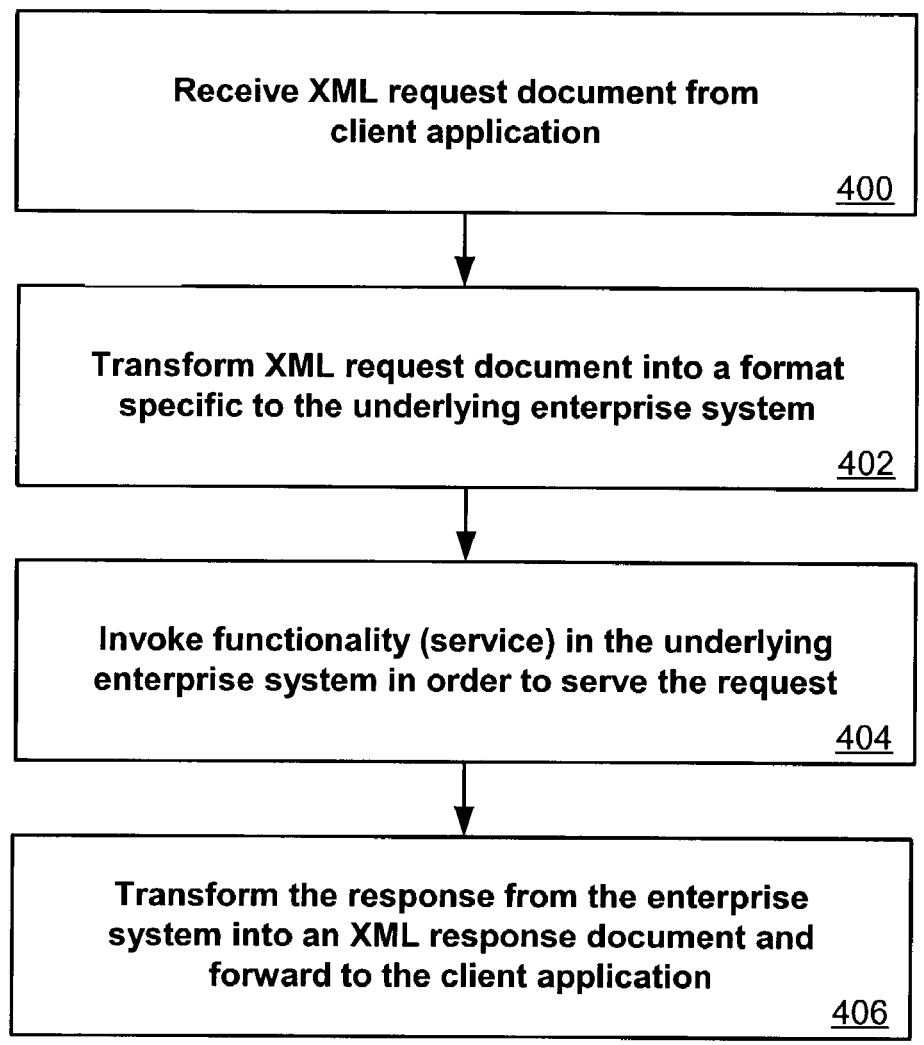
FIG. 6 is a flowchart showing a method that can be used with the system of FIG. 1.

Service adapters can perform at least the following four functions in one sequence shown, for example, in FIG. 6. First, service adapters can receive service requests, such as in the form of XML request documents, from an external client or client application 400. Service adapters can transform the XML request document into a format that is specific to the underlying enterprise system or EIS 402. The request document can conform to the request XML schema for the service, and the request XML schema can be based on metadata in the EIS. The service adapter can invoke an underlying function, functionality, or service in the enterprise system 404. The service adapter can be configured to wait for the response in an asynchronous mode, such as may take advantage of a call-back listener. The service adapter can also transform the response from an EIS-specific data format to an XML response document that conforms to the response XML schema for the service or client application 406. The response XML schema can be based on metadata in the EIS.

Service adapters may not contain application specifics, such that they can be plugged into any application server that supports the J2EE Connector Architecture specification. These adapters can be developed by making minor modifications to the procedures given for developing a service adapter.

Setting Up an Adapter

When setting up an adapter, it may be necessary to identify and collect critical information about the adapter the being developed. Such critical adapter information can include, for example, the EIS type, vendor, version, locale and national language of the deployment, the adapter logical name, and whether or not the adapter supports services. This information can be collected und used to create a custom development tree for the adapter. This tree can provide environment-specific instructions for deploying an adapter for application integration. Specifically, the tree can provide config.xml entries and the replacements for the path already made. In addition, the file can provide mapping information. Contents of a file such as overview.html can be copied directly into config.xml, which can facilitate adapter deployment.

After rebuilding an adapter, the adapter can be deployed into an application integration system. An adapter can be deployed manually, or can be deployed, for example, from an interface or application server console. An ADK logging toolkit can allow a user to log internationalized messages to multiple output destinations. This logging toolkit can leverage, for example, the work of the open source project Apache Log4j. This product can include software developed by the Apache Software Foundation.

Certain information may help a developer to conceptualize an adapter before coding. This information can also help to define such components as the adapter logical name and the Java package base name, and can help to determine the locales for which message bundles need to be localized.

Information to be gathered can include the name of the EIS for which the adapter is being developed, as well as the version of the EIS and the type of EIS, such as DBMS or ERP. It can also be useful to know the vendor name for this adapter, as well as the version number and adapter logical name. It can be determined whether the adapter needs to invoke functionality within the EIS and, if so, which services need to be supported by the adapter. The developer should determine which mechanism or API is provided by the EIS to allow an external program to invoke functionality provided by the EIS, as well as what information is needed to create a session/connection to the EIS for this mechanism. The information needed to determine which function(s) will be invoked in the EIS for a given service can also be obtained.

It can be determined whether the EIS allows querying for input and output requirements for a given function and, if so, what information is needed to determine the input requirements for the service. For all the input requirements, it can be determined which requirements are static across all requests, as the adapter can encode static information into an InteractionSpec object.

For all the input requirements, it can be determined which requirements are dynamic per request, as the adapter can provide an XML schema that describes the input parameters required by this service per request. The information needed to determine the output requirements for the service can also be important. If the EIS provides a mechanism to browse a catalog of functions the adapter can invoke, the adapter should probably support the browsing of services. If the adapter needs to receive notifications of changes that occur inside the EIS, the adapter may need to support events. The mechanism or API provided by the EIS to allow an external program to receive notification of events in the EIS can be obtained in order to help determine whether a pull or a push mechanism is to be developed. It can also be determined whether the EIS provides a way to determine which events your adapter can support, as well as whether the EIS provides a way to query for metadata for a given event. It can also be desirable to determine which languages might need to be supported.

Before developing a service adapter, a user may wish to determine the EIS and the appropriate service required for the adapter, based upon the user's knowledge of the EIS. The user can also identify the interface to the back-end functionality, as well as the "expensive" connection object required to invoke a function within the EIS. The expensive connection object is a resource required to communicate with the EIS and can require the allocation of system resources, such as a socket connection or DBMS connection. A valuable asset of the J2EE Connector Architecture is that the application server can provide pooling of these objects. Therefore, a user can first determine this object for the adapter, as it may need to be pooled by the application server.

A user can also determine the security needs for the service adapter. The user may need to consider and understand how to pass connection authentication across the connection request path. To do this, the adapter may need to implement a connectionRequestInfo or similar class. An ADK can provide a class such as ConnectionRequestInfoMap to map authorization information, such as username and password, to the connection to facilitate ConnectionRequestInfo implementation.

A user can also determine the necessary transaction support, identifying which type of transaction demarcation support to implement with the adapter. These can include local transaction demarcations and XA-compliant transaction demarcations. The XAResource API (XA) is a standard protocol for two-faced commitment across diverse services or applications.

A second step involves configuring the development environment in order to prepare a computer for adapter development, where the computer includes memory and a processor. In some embodiments, these steps can be completed simply be running a utility such as a GenerateAdapterTemplate utility.

The user can set up the necessary file structure. When setting up application integration, a user can create a file structure necessary not only to run an adapter, but also to use an ADK. A user can verify that, upon installation, the necessary directories and files appear in the proper directory. When cloning a development tree, such as by using a GenerateAdapterTemplate, the file paths and files under adapters can be automatically cloned and updated to reflect the new development environment.

A user can then set up the build process. An ADK can employ a build process based upon Ant, a 100% pure Java-based build tool. An Ant build file can contain the tasks needed to build a J2EE-compliant adapter. Running a GenerateAdapterTemplate or similar utility to clone a development tree for an adapter can create a build.xml file specifically for that adapter. This can free the user from having to customize the sample build.xml and can ensure that the code is correct.

Among the files created by GenerateAdapterTemplate can be a manifest file, such as MANIFEST.MF. This file can contain classloading instructions for each component that uses the file. A manifest file can be created for each /META-INF directory, possibly except ear/META-INF.

The file can contain version information and vendor information, as well as the relevant classpath or classloading instructions. The Class-Path property can contain references to resources required by the component, can can identify the shared .jar files. A user can ensure that these .jar files are included in the shared area of the .ear file. If the filename MANIFEST.MF appears in a .war file, it should appear in uppercase letters if being used with a Unix system. If it does not, Unix may not recognize the filename and an error may occur.

Any message destined for an end-user can be placed in a message bundle. A message bundle is simply a .properties text file that can contain key=value pairs that allow a user to internationalize messages. When a locale and national language are specified at run time, the contents of the message can be interpreted, based upon a key=value pair, and the message can be presented to the user in the correct language for his or her locale.

Adapter Development Kit (ADK)

An adapter development kit (ADK) can be used to facilitate the construction of adapters that will run, for example, in any J2EE-compliant environment. These adapters can have additional, value-added functionality when hosted within an integration framework component. An ADK can provide tools to allow adapter developers to create bi-directional adapters that support the business-level concepts of events and services. An adapter developed using the ADK can provide access to an application's metadata, which can be used to define events and services via the application view. The ADK can provide run-time support for events and services. The ADK can also provide support for constructing thin, JSP-based user interfaces for use in defining application views based on the adapter.

An ADK can provide a collection of frameworks to support the development, packaging, and distribution of adapters, such as a design-time framework, a run-time framework, a logging/auditing framework, and a packaging framework. A design-time framework can provide a tool set to support the development of a user interface for an adapter. The user interface can be used for defining and deploying application views. This can be a powerful feature, as it can make the adapter capabilities easier to use, giving the adapter a wider audience.

An ADK run-time framework can provide a complete, extensible event generator to support the development of event adapters. To support the development of service adapters, the runtime framework can provide a complete, but minimally functional J2EE-compliant adapter. Adapter developers can save time coding and debugging by starting with and extending this base framework.

An ADK packaging framework can also be utilized that provides a tool set for packaging an adapter for delivery to a customer. This framework can make the creation of various archive and environment files easy for adapter developers.

An ADK can address three requirements for adapter development, including a requirement for structure. Regarding structure, a prominent theme in any integrated development and debugging environment, such as IDDE, is development project organization. A well structured development environment is desirable so that a user can immediately begin coding the adapter. A user will usually prefer not to spend time designing and organizing a build process. An ADK can provide an organized development environment, build process, intuitive class names and class hierarchy, and test methodology. Since an ADK encompasses so many advanced technologies, an incremental development process can be the key to success. An ADK test process can allow a developer to make a simple change and test it immediately.

Another requirement for some embodiments includes a minimal exposure to users of the details of peripheral implementation. Peripheral implementation details are sections of code that are needed to support a robust software program, but are not directly related to the kernel of the program. Moreover, peripheral implementation details are sections of code that are needed to support the framework the software program runs in. For example, the J2EE Connector Architecture specification requires that the JAVAX.RESOURCE.CCI.INTERACTIONSPEC implementation class provide getter and setter methods that follow the JavaBeans design pattern. To support the JavaBeans design pattern, a user may need to support PROPERTYCHANGELISTENERS and VETOABLECHANGELISTENERS in an implementation class. A user will not want to have to study the JavaBeans specification to learn how to do this, but would prefer to focus on implementing the enterprise information system (EIS)-specific details of the adapter. The ADK provides base a base implementation for a majority of the peripheral implementation details of an adapter.

It can also be desirable to have a clear road map to success. A key concept in adapter development is the exit criteria. The exit criteria answers the question: "How do I know I am done with an implementation?" In other words, a clear road map details that which needs to be implemented in order to complete an adapter. An ADK can provide a clear methodology for developing an adapter. The ADK methodology organizes a user's thoughts around a few key concepts: events, services, design time, and run time.

An ADK can provide run-time support for events and services. An ADK can also include an API to integrate an adapter's user interface into an application view management console. Another added value that can be provided by an ADK is that adapters can become an integral part of a single graphical console application that allows business users to construct integration solutions.

Resource adapters, which shall be referred to herein as "adapters," are software components that connect one application to another when those applications are not originally designed to communicate with each other. For example, an order entry system built by one company can require an adapter to communicate with a customer information system built by another.

By using an ADK, a user can create at least two types of adapters: service adapters, which consume messages, and event adapters, which. generate messages. A user can also use the ADK to create J2EE-compliant adapters that are not specific to an application or application integration environment, but still comply with the J2EE Connector Architecture specification.

An ADK can provide an abstract foundation for an adapter, such as an AbstractManagedConnectionFactory. This foundation can provide basic support for internationalization/localization of exception and log messages for an adapter, as well as providing hooks into the log toolkit. An ADK can also provide getter and setter methods for standard connection properties, such as username, password, server, connectionURL, and port. An ADK can provide access to adapter metadata gathered from a java.util.ResourceBundle for an adapter. An ADK also can allow adapter providers to plug license checking into the initialization process for the factory. If the license verification fails, then client applications cannot get a connection to the underlying EIS, thus making the adapter useless. An ADK can also provide state verification checking to support JavaBeans-style post-constructor initialization.

Logging

One feature of an adapter that can be essential for certain applications is logging. When an adapter encounters an error or warning condition, the adapter may not be able to stop processing and wait for an end-user to respond. The adapter can therefore provide an accurate audit log for tracking errors. An ADK can include a logging framework that gives adapter developers the ability to log internationalized and localized messages to multiple output destinations.

J2EE Connector Architecture

The lack of widely adopted standards within the application integration market is being addressed by the introduction of standards such as the J2EE Connector architecture and the Java Messaging Service (JMS). JMS provides a standard programming interface to message transport mechanisms. The J2EE Connector architecture provides a standard for application adapters. A J2EE Connector architecture adapter can run within any integration server that supports the J2EE Connector architecture standard.

The adoption of standards such as the J2EE Connector architecture allows packaged application vendors to construct application adapters that will work within any compliant application server. However, the architecture is a new standard that only addresses low-level integration issues. For example, the connector architecture is unidirectional, allowing for synchronous communication from an integration server to an external application. The connector architecture does not, however, specify how an external application can asynchronously send data to an integration server. It also does not provide any common or required interface for application adapters, nor specify how data passed between adapters and applications are encoded.

Basic services, such as events, receiving XML, returning XML, and self-describing available services/events, are not addressed in the J2EE Connector architecture. This is one major advantage to using an application view in accordance with one embodiment of the present invention.

The J2EE connector architecture also fails to address application integration at the business level. An application framework in accordance with the present invention adds value to the connector architecture by providing support for business process-level integration and bi-directional data flow between the framework integration server and external applications. A business-level view can be implemented on top of the connector architecture that consists of events and services. An event can be a message delivered asynchronously via JMS from an application, such as by an application adapter, to the framework server. A service can be a function provided by an application that any business process can invoke via the application's adapter.

Integration Framework

Application integration can utilize an integration framework, which can provide a systematic, standards-based architecture for hosting application views. Features of such a framework can include application views for exposing application functions and design-time graphical user interfaces (GUIs), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

GUI

Along with event and service adapters, an ADK design-time framework can provide the tools needed to build a Web-based GUI that adapter users need to define, deploy, and test their application views. Although each adapter can have EIS-specific functionality, each adapter can require a GUI for deploying application views. This framework can minimize the effort required to create and deploy these interfaces. This minimization can be accomplished at least in part by using two primary components. One of these components is a Web application component that allows a user to build an HTML-based GUI by using, for example, Java Server Pages (JSP). This component can be augmented by tools such as JSP templates, a tag library, and the JavaScript library. A second component is a deployment helper component or request handler that can provide a simple API for deploying, undeploying, and editing application views on an application server.

An application view can represent both events and services that support a business purpose. This can allow a business user to interact with the application view for all communication with an application. This bi-directional communication can be supported by an event adapter and/or a service adapter. An application view can abstract this fact from the user and present the user with a unified business interface to the application.

An ADK packaging framework can provide a tool set for packaging an adapter for delivery to a customer. Ideally, all adapters are installed, configured, and uninstalled the same on a single application server. Moreover, all service adapters can be J2EE compliant. The packaging framework can make creating a J2EE adapter archive (.rar) file, Web application archive (.war) file, the enterprise archive (.ear) file, and application integration design environment archive easy.

Run-time versus Design-time

Adapter activity typically falls within one of two conceptual entities: run time and design time. Run time refers to functionality that occurs when adapters execute their processes. Design time refers to the adapter user's implementation of an application view. In essence, design time is the act of creating, deploying, and testing an application view.

Run time and design time can be characterized in an ADK by run-time and design-time frameworks. A run-time framework can be comprised of the tools used when developing adapters, while the design-time framework can refer to the tools used to design Web-based user interfaces.

A run-time framework is a set of tools that can be used to develop event and service adapters. To support event adapter development, the run-time framework can provide a basic, extensible event generator. For service adapter development, the run-time framework can provide a complete J2EE-compliant adapter.

Classes supplied by the run-time framework can provide several following benefits. One benefit of such a class is that it can allow a user to focus on EIS specifics rather than J2EE specifics. The classes can also minimize the effort needed to use the ADK logging framework, can simplify the complexity of J2EE Connector Architecture, and can minimize redundant code across adapters.

In addition, a run-time framework can provide abstract base classes to help implement an event generator to leverage the event support provided by an ADK environment. A key component of a run-time framework is a run-time engine, which can host the adapter component responsible for handling service invocations, and can manage physical connections to the EIS, login authentication, and transaction management, all in compliance with the J2EE Connector Architecture standard.

A design-time interface for each adapter can include a J2EE Web application that is bundled as a .war file. A Web application can comprise a bundle including .jsp, .html, image files. A Web application descriptor can be implemented using, for example, web.xml. The descriptor can instruct the J2EE Web container to deploy and initialize the Web application. Every Web application can have a context that is specified during deployment. This context can identify resources associated with the Web application, such as under the Web container's doc root.

Service as Business Operation

A service can be a business operation, within an application, that is exposed by an application view. The service can exist as a request/response mechanism. When an application receives a request to invoke a business service, the application view can invoke that functionality within its target application and return, or respond with, an XML document that describes the results. To define a service, a user may need to determine and define the input requirements, output expectations, and the content of the interaction specification.

Adapter Logical Name

Each adapter can have an adapter logical name, a unique identifier that represents an adapter and can serve as an organizing principle for all adapters. An adapter logical name can also be used to name a message bundle, a logging configuration, and log categories. An adapter logical name can be, for example, a combination of vendor name, the type of EIS connected to the adapter, and the version number of the EIS. By convention, this information can be expressed as VENDOR_ EIS-TYPE_EIS version.

An adapter logical name can be used with adapters in a number of ways. One way is to use the adapter logical name as a convention. Another way is to use the adapter logical name during adapter deployment as part of the .war, .rar, .jar, and .ear filenames. The adapter logical name can also be used as an organizing principle, or as a return value to an abstract method such as getAdapterLogicalName( ).

The Name attribute of a <ConnectorComponent> element can be an adapter logical name. This attribute can then act as a key that is used by an application integration component to associate application views with a deployed resource adapter, as shown for the following sample adapter:

<ConnectorComponent
    Name="SAMPLE_ADK"
    Targets="myserver"
    URI="SAMPLE_ADK.rar"/>

The adapter logical name can be used as the name of the .rar file as a convention, but is not required in the URI attribute.

A process such as logging can use an adapter logical name as an organizing principle. The adapter logical name can be used as the base log category name for all log messages that are unique to that adapter. Consequently, the adapter logical name can be passed as the value for the parameters such as:

RootLogContext in INTEGRATION_HOME/adapters/ ADAPTER/src/eventrouter/WEB-INF/web.xml
    RootLogContext in INTEGRATION_HOME/adapters/ ADAPTER/src/rar/META-INF/ra.xml
    RootLogContext in INTEGRATION_HOME/adapters/ ADAPTER/src/rar/META-INF/weblogic-ra.xml
    RootLogContext in INTEGRATION_HOME/adapters/ ADAPTER/src/war/WEB-INF/web.xml In addition, an adapter logical name can be used as the base for the name of the Log4J configuration file for the adapter. ".xml" can be appended to the name. For example, the Log4J configuration file for an adapter can be SAMPLE_ADK.xml.

An adapter logical name can also be used for localization. The adapter logical name can be used as the base name for message bundles for an adapter. For example, the default message bundle for a sample adapter can be SAMPLE_ADK.properties. Consequently, the adapter logical name can be passed as the value for the parameters such as:

MessageBundleBase in INTEGRATION_HOME/adapters/ADAPTER/src/eventrouter/WEB-INF/web.xml
    MessageBundleBase in INTEGRATION_HOME/adapters/ADAPTER/src/rar/META-INF/ra.xml
    MessageBundleBase in INTEGRATION_HOME/adapters/ADAPTER/src/rar/META-INF/weblogic-ra.xml
    MessageBundleBase in INTEGRATION_HOME/adapters/ADAPTER/src/war/WEB-INF/web.xml Lastly, the adapter logical name can be used as a return value to an abstract method such as getAdapterLogicalName ( ) on a request handler such as com.adapter.web.AbstractDesignTimeRequestHandler. This return value for RootLogContext for a connection factory.

Example Methods

There are several key methods for which a user can supply implementations. One method, createConnectionFactory( ), can be responsible for constructing the factory for application-level connection handles for the adapter. In other words, clients of the adapter can use the object returned by this method to obtain a connection handle to the EIS.

If the adapter supports a CCI interface, a user can return an instance of ConnectionFactoryImpl or an extension of this class. The key to implementing this method correctly can be to propagate the ConnectionManager, LogContext, and ResourceAdapterMetaData into the client API.

Another method, createManagedConnection( ), can be responsible for constructing a ManagedConnection instance for the adapter. A ManagedConnection instance can encapsulate the expensive resources needed to communicate with the EIS. This method can be called by the ConnectionManagerwhen it determines a new ManagedConnection is required to satisfy a client's request. A common design pattern with adapters is to open the resources needed to communicate with the EIS in this method and then pass the resources into a new ManagedConnection instance.

A checkState( ) method can get called by an AbstractManagedConnectionFactory before it attempts to perform any of its factory responsibilities. This method can be used to verify that all members that need to be initialized before the ManagedConnectionFactory can perform its SPI responsibilities have been initialized correctly.

Lastly, a ManagedConnectionFactory can supply an implementation of a matchManagedConnections( ) method. The AbstractManagedConnectionFactory can provide an implementation of the matchManagedConnections( ) method that relies upon the compareCredentials( ) method on AbstractManagedConnection.

In order to provide logic that will match managed connections, a user may need to override AbstractManagedConnection's compareCredentials( ) method. This method can be invoked when the ManagedConnectionFactory attempts to match a connection with a connection request for the ConnectionManager.

The following listing shows one example of how to programmatically ping a connection:

```
    return ping ( );
}
            boolean bUserNameMatch = true;
            String strPcUserName = pc.getUserName ( );
            if (m_strUserName != null)
{
loqger.debug(this.toString( ) + "compareCredentials >>> comparing
  my username ["+m_strUserName+"] with client username
  ["+strPcUserName+"]") ;
```

It can then be determined whether the user supplied in either the Subject or the ConnectionRequestInfo is the same as the current user. Reauthentication may not be supported in this adapter, so if they do not match, this instance cannot satisfy the request. The following line of code is one way of doing that:

```
    bUserNameMatch=m_strUserName.equals(strPcUser-
        Name);
```

If usernames match, the connection can be pinged to determine if this is still a good connection. Otherwise, there is no match and no reason to ping. The following line of code can do that:

```
    return bUserNameMatch?ping( ):false;
```

Adding Services

For service adapters, it may be necessary to implement a service descriptor method, such as initServiceDescriptor( ), so that the adapter user can add services at design time. One way to implement this method is as follows:

protected abstract void initServiceDescriptor(ActionResult result, IServiceDescriptor sd, HttpServletRequest request) throws Exception This method can be invoked, for example, by an addservc( ) implementation for an abstract design time request handler. The implementation can be responsible for initializing the EIS-specific information of a parameter such as "IserviceDescriptor." The base class implementation of addservc( ) can be used for error handling, and the addservc( ) method can be invoked when the user submits an addservc JSP, for example.

Editing Services

If adapter users are to be able to edit services during design time, it may be necessary to edit an integration properties file, create edit service (i.e., edtservc.jsp) forms, and implement some service-specific methods. For instance, it may be necessary to add properties to an application integration properties file (i.e., ai.properties) such as the following example properties:

edtservc_title=Edit Service
edtservc_description=On this page, you edit service properties.
edtevent_description=On this page, you edit event properties.edtevent_title=Edit Event
glossary_description=This page provides definitions for commonly used terms.
service_submit_add=Add
service_label_serviceDesc=Description:
service_submit_edit=Edit
service_label_serviceName=Unique Service Name:
event_submit_add=Add
event_label_eventDesc=Description:
event_label_eventName=Unique Event Name:
event_submit_edit=Edit
eventLst_label_edit=Edit
serviceLst_label_edit=Edit
event_does_not_exist=Event {0} does not exist in application view {1}.
service_does_not_exist=Service {0} does not exist in Application View {1}.
no_write_access={0} does not have write access to the Application View.

Edit service (e.g., edtservc.jsp) and add service (e.g., addservc.jsp) Java server pages can be called in order to provide editing capabilities. One main difference between "edit" JSP files and "add" JSP files is the loading of descriptor values. For this reason, adapters such as DBMS and e-mail adapters can use the same HTML for both editing and adding. These HTML files can be statically included in the JSP page, which can save duplication of JSP/HTML and properties.

In order to initialize controls with values defined in the descriptor, a method such as loadServiceDescriptorProperties( ) can be loaded on the abstract design time request handler. This method can be used to set the service properties into the RequestHandler. Once these values are set, the RequestHandler can map the values to the controls being used in the JSP file. A default implementation of loadServiceDescriptorProperties( ) can use the property name associated with the ADK tag to map the descriptor values. If values other than ADK tag names are used to map the properties for a service, these methods can be overridden to provide the descriptor to the ADK tag-name mapping.

The RequestHandler can be initialized prior to the resolution of HTML, and in some embodiments this initialization should only take place once. Code used to load the edtservc.jsp can be as follows:

if(request.getParameter("serviceName")!=null){handler.loadServiceDescriptorProperties(request);}

The edtservc.jsp can submit to edtservc. For example:

<adk:submit name='edtservc_submit' doAction='edtservc'/>

Finally, certain methods may need to be implemented with edtservc.jsp files. These can include methods such as loadServiceDescriptorProperties( ), which can be used to load the RequestHandler with the ADK tag-to-value mapping. If the developer uses the same values to name the ADK tag and load the Service Descriptor, then the mapping can be free. Otherwise, the developer may need to override these methods in a design time RequestHandler to provide these mappings.

Another method that may need to be implemented includes boolean supportsEditableServices( ), which can be used as a marker. If the method returns true, the edit link can be displayed on an application view administration page or window. Override can be provided through the design time request handler.

An editServiceDescriptor( ) method can be implemented, which can be used to persist the edited service data. This method can extract ADK tag values from the request and add them back into the service descriptor. In addition, the method can handle any special processing for the schemas associated with the service. If the schemas need modification, they can be updated here. Once the values read in from the request are no longer needed, they can be removed from the RequestHandler.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for connecting a client application to an enterprise information system, comprising:

a computer including one or more processors, and an application server operating on the computer and enabling communication of requests and responses between a client application and an enterprise information system;

an application view component executing on the application server, wherein the application view component provides a view of services and events of the enterprise information system that are exposed by a plurality of adapters executing on the application server, wherein the plurality of adapters include one or more software service adapters and one or more software event adapters, and provides an interface to customize the application view, wherein the interface is used to define and deploy the application view, including defining the services and events of the enterprise information system exposed by the plurality of adapters, and wherein the client application uses the interface to make requests to, and receive responses from, the enterprise information system;

wherein the application view component, upon receiving a request from the client application
generates a unique identifier to filter back a response from the enterprise information system to the client application,
generates a request document containing the request readable by an asynchronous service adapter to be sent to the enterprise information system, wherein the request document is in a format specific to the enterprise information system, and
releases the asynchronous service adapter to process a subsequent request from the client application;

wherein the enterprise information system processes the request by locating a required information from the enterprise information system, wherein upon processing the request a response document including the response is sent to the application view component.

2. A system according to claim 1, wherein:
the service adapter passes requests and responses as XML documents.

3. A system according to claim 1, wherein:
the service adapter passes requests and responses using point-to-point messaging.

4. A system according to claim 1, wherein:
the service adapter invokes a service that allows asynchronous messaging between the application view and the enterprise information system.

5. A system according to claim 1, further comprising:
a connection factory adapted to create connections for the service adapter.

6. A system according to claim 1, further comprising:
a connector architecture mechanism adapted to provide at least one of connection pooling, transaction management, and security services for the service adapter.

7. A system according to claim 1, further comprising:
an interaction component adapted to allow the service adapter to determine the functionality in the enterprise information system being invoked for the service.

8. A system according to claim 1, further comprising:
a call-back listener adapted to handle a response for the application view that is received from the enterprise information system.

9. A system according to claim 1, further comprising:
a JMS queue adapted to receive a request from the application view component and store the request until the request is passed to the enterprise information system.

10. A system according to claim 1, wherein:
the service adapter is further adapted to transform data passing between the enterprise information system and a client application.

11. A system according to claim 10, wherein:
the service adapter uses XML to transform the data.

12. A system according to claim 1, further comprising:
a user interface for the service adapter adapted to allow the definition and deployment of the application view component.

13. A system according to claim 1, wherein:
the service adapter is adapted to transform an XML request document into a format specific to the enterprise information system.

14. A system according to claim 1, wherein:
the service adapter is adapted to transform a response in format specific to the enterprise information system to an XML response document that conforms to an XML schema for the service being invoked.

15. A system according to claim 1, further comprising:
a development tree for the service adapter that contains critical information for the service adapter.

16. A system according to claim 15, wherein:
the development tree contains critical information including information selected from the group consisting of enterprise information system type, vendor, version, locale of deployment, language of deployment, and adapter logical name.

17. A system according to claim 1, wherein:
the service adapter provides for the browsing of services in the enterprise information system.

18. A system according to claim 1, further comprising:
a security mechanism adapted to map authorization information across the path of a request from the application view component through the service adapter to the enterprise information system.

19. A system according to claim 1, wherein:
the service adapter is adapted to support transactions selected from the group consisting of local transactions and XA-compliant transactions.

20. A system according to claim 1, wherein:
the service adapter is adapted to provide access to metadata for the client application, the metadata useful in defining services via the application view.

21. A system according to claim 1, wherein:
the service adapter is further adapted to track errors encountered in processing one of a request and response.

22. A system according to claim 1, wherein:
the service adapter is J2EE compliant.

23. A system according to claim 1, further comprising:
a run-time engine adapted to host the service adapter.

24. A system according to claim 23, wherein:
the run-time engine is further adapted to manage connections to the enterprise information system.

25. A system according to claim 1, wherein:
the service adapter has an adapter logical name that represents the service adapter.

26. A system according to claim 1, further comprising:
a managed connection instance for the service adapter, encapsulating resources necessary to communicate with the enterprise information system.

27. A system according to claim 1, further comprising:
a service descriptor method for the service adapter, allowing services to be added at design-time.

28. A method for invoking functionality in an enterprise system through a service adapter, comprising:
providing a computer, including one or more processors, and an application server operating on the computer and enabling communication of requests and responses between a client application and an enterprise information system;
providing at the application server
an application view component executing on the application server, wherein the application view component provides an application view of services and events of the enterprise information system that are exposed by a plurality of adapters executing on the application server, wherein the plurality of adapters include one or more software service adapters and one or more software event adapters, and an interface to customize the application view, wherein the interface is used to define and deploy the application view, including defining the services and events of the enterprise information system exposed by the plurality of adapters, and wherein the client application uses the interface to make requests to, and receive responses from, the enterprise information system;

wherein the application view component, upon receiving a request from the client application generates a unique identifier to filter back a response from the enterprise information system to the client application, generates a request document containing the request readable by an asynchronous service adapter to be sent to the enterprise information system, wherein the request document is in a format specific to the enterprise information system, and releases the asynchronous service adapter to process a subsequent request from the client application;

wherein the enterprise information system processes the request by locating a required information from the enterprise information system, wherein upon processing the request a response document including the response is sent to the application view component.

29. A method according to claim 28, further comprising:
passing requests and responses as XML documents.

30. A method according to claim 28, further comprising:
passing requests and responses using point-to-point messaging.

31. A method according to claim 28, further comprising:
allowing asynchronous messaging to and from the enterprise information system.

32. A method according to claim 28, further comprising:
creating connections for the service adapter.

33. A method according to claim 28, further comprising:
providing at least one of connection pooling, transaction management, and security services for the service adapter.

34. A method according to claim 28, further comprising:
using a call-back listener to handle a response that is received from an enterprise information system.

35. A method according to claim 28, further comprising:
storing a request to a JMS queue until the request is passed to the enterprise system.

36. A method according to claim 28, further comprising:
mapping authorization information across the path of a request to the enterprise information system.

37. A method according to claim 28, further comprising:
tracking errors encountered in processing one of a request and response.

38. A non-transitory computer readable storage medium storing one or more sequences of instructions for connecting a client application to an enterprise information system, wherein said instructions, when executed by one or more processors, cause the one or more processors to execute the steps of:

providing a computer, including one or more processors, and an application server operating on the computer and enabling communication of requests and responses between a client application and an enterprise information system;

providing at the application server an application view component executing on the application server, wherein the application view component provides an application view of services and events of the enterprise information system that are exposed by a plurality of adapters executing on the application server, wherein the plurality of adapters include one or more software service adapters and one or more software event adapters, and an interface to customize the application view, wherein the interface is used to define and deploy the application view, including defining the services and events of the enterprise information system exposed by the plurality of adapters, and wherein the client application uses the interface to make requests to, and receive responses from, the enterprise information system;

wherein the application view component, upon receiving a request from the client application generates a unique identifier to filter back a response from the enterprise information system to the client application, generates a request document containing the request readable by an asynchronous service adapter to be sent to the enterprise information system, wherein the request document is in a format specific to the enterprise information system, and releases the asynchronous service adapter to process a subsequent request from the client application;

wherein the enterprise information system processes the request by locating a required information from the enterprise information system, wherein upon processing the request a response document including the response is sent to the application view component.

39. The system of claim 1 wherein an adapter development kit, also executing on the application server, is used to facilitate the construction of the adapters and testing of the application view component.

40. The method of claim 28 wherein an adapter development kit, also executing on the application server, is used to facilitate the construction of the adapters and testing of the application view component.

41. The non-transitory computer readable storage medium of claim 38 wherein an adapter development kit, also executing on the application server, is used to facilitate the construction of the adapters and testing of the application view component.

* * * * *